US012564923B2

(12) United States Patent
Maierhofer et al.

(10) Patent No.: US 12,564,923 B2
(45) Date of Patent: Mar. 3, 2026

(54) MOUNTING TOOL FOR POSITIONING A SHAFT SEALING RING ON A SHAFT AND METHOD FOR PRODUCING A SHAFT SEAL

(71) Applicant: MAGNA Powertrain GmbH & Co KG, Lannach (AT)

(72) Inventors: Harald Maierhofer, Vorau (AT); Bernhard Kummer, Grosssteinbach (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 458 days.

(21) Appl. No.: 18/028,404

(22) PCT Filed: Sep. 14, 2021

(86) PCT No.: PCT/EP2021/075181
§ 371 (c)(1),
(2) Date: Mar. 24, 2023

(87) PCT Pub. No.: WO2022/063631
PCT Pub. Date: Mar. 31, 2022

(65) Prior Publication Data

US 2023/0356374 A1 Nov. 9, 2023

(30) Foreign Application Priority Data

Sep. 28, 2020 (DE) ......................... 102020212175.3

(51) Int. Cl.
*B25B 27/00* (2006.01)

(52) U.S. Cl.
CPC ................................ *B25B 27/0028* (2013.01)

(58) Field of Classification Search
CPC ..... B25B 27/0028; B25B 27/10; B25B 27/12; B21J 1/00; B21J 13/06
See application file for complete search history.

(56) References Cited

U.S. PATENT DOCUMENTS 4,003,305 A * 1/1977 King .................. B30B 15/0029 29/251
4,197,795 A * 4/1980 Hawkins ................ B30B 15/04 29/251

(Continued)

FOREIGN PATENT DOCUMENTS

DE 211744 A1 7/1984
DE 3635250 A1 4/1988

(Continued)

OTHER PUBLICATIONS

International Search Report (ISR) and Written Opinion for International Application No. PCT/EP2021/075181 mailed Dec. 14, 2021, English Translation of the ISR included, 12 pages.

(Continued)

*Primary Examiner* — Lee D Wilson
(74) *Attorney, Agent, or Firm* — Dickinson Wright PLLC

(57) ABSTRACT

A mounting tool for positioning a shaft sealing ring on a shaft against a curvature of a sealing lip of a shaft sealing ring, wherein the shaft sealing ring has an annular main body, a sealing lip and can be applied to the shaft and a spring washer for pre-tensioning the sealing lip in the direction of the shaft, wherein the sealing lip has a curvature which is outward in the direction of an opening formed by the shaft sealing ring, comprising a bottom part and a top part, wherein the top part is removably fastened to the bottom part in that one end thereof is inserted partially into the bottom part, wherein another end of the top part, is substantially conical and an outside diameter of the bottom part corresponds to the maximum expansion diameter of the sealing lip of the shaft sealing ring.

9 Claims, 5 Drawing Sheets

(56) References Cited

U.S. PATENT DOCUMENTS

| | | | | |
|---|---|---|---|---|
| 5,669,296 | A * | 9/1997 | Newton | B30B 1/18<br>100/231 |
| 8,065,955 | B2 * | 11/2011 | Braun | B30B 15/04<br>72/455 |
| 2005/0172469 | A1 * | 8/2005 | Humpert | F16B 37/068<br>29/243.5 |
| 2006/0150390 | A1 * | 7/2006 | Humpert | B21D 39/03<br>29/521 |
| 2015/0230939 | A1 * | 8/2015 | Froidevaux | B25B 5/163<br>29/256 |
| 2023/0356374 | A1 * | 11/2023 | Maierhofer | F16J 15/3268 |

FOREIGN PATENT DOCUMENTS

| | | | |
|---|---|---|---|
| EP | 0498929 | A1 | 8/1992 |
| EP | 0942208 | A2 | 9/1999 |
| EP | 1359353 | A2 | 11/2003 |
| EP | 3456476 | A1 | 3/2019 |
| KR | 20080051872 | A | 6/2008 |

OTHER PUBLICATIONS

German Search Report from the German Patent Office for related German Patent Application No. 1020202012175.3 dated May 11, 2021, 2 pages.

* cited by examiner

2

MOUNTING TOOL FOR POSITIONING A SHAFT SEALING RING ON A SHAFT AND METHOD FOR PRODUCING A SHAFT SEAL

CROSS-REFERENCE TO RELATED APPLICATIONS

This application is a National Stage of International Application No. PCT/EP2021/075181, filed Sep. 14, 2021, which claims priority to German Patent Application No. 102020212175.3, filed Sep. 28, 2020. The entire disclosures of each of the above applications are incorporated herein by reference.

FIELD OF THE INVENTION

The present invention relates to a two-part mounting tool for positioning a shaft sealing ring on a shaft as well as a method for producing a shaft seal with a shaft sealing ring for a shaft guided out of a housing with the aid of such a mounting tool.

BACKGROUND OF THE INVENTION

This section provides information related to the present disclosure which is not necessarily prior art Shaft sealing rings are used to seal machine housings at exiting elements, in particular rotating shafts, from the surroundings.

In the case of such a shaft sealing ring, its sealing lip can be curved in one direction. In order to prevent everting of and damage to the sealing lip during mounting or positioning of the shaft, a substantially cup-shaped mounting sleeve is normally used during pushing of the shaft sealing ring onto the shaft or during introduction of the shaft into the shaft sealing ring, which mounting sleeve is removed again.

SUMMARY OF THE INVENTION

This section provides a general summary of the disclosure, and is not a comprehensive disclosure of its full scope or all of its features.

One object of the invention is to indicate an alternative mounting tool which is characterized in particular in that it enables easy and orderly positioning of a shaft sealing ring on a shaft opposite to a preferred mounting direction of a shaft sealing ring, namely in a direction in which a sealing lip of the shaft sealing ring tends to evert. It is furthermore an object of the invention to indicate a method which enables reliable shaft sealing with the aid of the mounting tool.

This requirement can be satisfied by the subject matter of the present invention according to independent claims 1 and 4. Advantageous embodiments of the present invention are described in the dependent claims.

The mounting tool according to the invention serves the purpose of reliable positioning of a shaft sealing ring on a shaft, wherein the positioning of the shaft sealing ring on the shaft is performed counter to a preferred mounting direction of the shaft sealing ring, namely counter to a curvature of a sealing lip of the shaft sealing ring.

The shaft sealing ring has according to the invention a metallic, annular main body, a sealing lip which is arranged fixedly on the main body and can be placed in a sealing manner onto the shaft and a spring washer for pretensioning the sealing lip, wherein the sealing lip has a curvature which is directed outward, in the direction of the shaft. The sealing lip is preferably manufactured from a wear-resistant elastomeric material.

According to the invention, the mounting tool is embodied in two parts and comprises a cup-shaped bottom part and a lid-like top part.

In accordance with the present invention, the top part is fastened detachably on the cup-shaped bottom part by virtue of the fact that it at one end, namely at a first end, is pushed partially into the bottom part and at the other end, namely at a second end pointing away from the bottom part, is embodied to be substantially conical, tapering in the direction of the second end of the top part.

According to the invention, the outer diameter of the bottom part is designed for the maximum expansion diameter of the shaft sealing ring, more precisely the sealing lip of the shaft sealing ring.

The top part is preferably manufactured at least partially from a wear-resistant plastic.

The bottom part of the mounting tool is preferably produced from surface-hardened steels in order to ensure wear resistance and resistance against damage (scratches) of the bottom part.

The term “first direction” should be understood in this context as a direction along the curvature of the sealing lip of the shaft sealing ring, i.e. opposite an open side of the shaft sealing ring. This is a preferred mounting direction of the shaft sealing ring. The term “second direction” should be understood in this context as a direction opposite to the curvature of the sealing lip of the shaft sealing ring, i.e. in the direction of the open side of the shaft sealing ring. This is a non-preferred mounting direction of the shaft sealing ring.

The method according to the invention for producing a shaft seal with a shaft sealing ring as already described above for a shaft guided out of a housing in a mounting direction counter to a curvature of the sealing lip of the shaft sealing ring, i.e. in the direction of the open side of the shaft sealing ring, is performed using a mounting tool described above and comprises at least the following steps:

1.) passing through the shaft sealing ring with the mounting tool, the top part first, along a first direction, namely a direction along the curvature of the sealing lip of the shaft sealing ring, i.e. opposite the open side of the shaft sealing ring, so that the sealing lip of the shaft sealing ring is spread open to its maximum expansion diameter by the bottom part counter to the force of the spring washer of the shaft sealing ring, As a result of the conical formation of the top part of the mounting tool, easy and reliable spreading apart of a shaft sealing ring, more precisely the sealing lip of the shaft sealing ring, from a preferred mounting direction, namely the first direction along the curvature of the sealing lip, i.e. opposite the open side of the shaft sealing ring, is enabled.

2.) removing the top part from the bottom part along the first direction,

3.) introducing the shaft into the bottom part of the mounting tool, wherein the shaft is guided along a second direction, namely a direction counter to the first direction and thus counter to the curvature of the sealing lip of the shaft sealing ring, i.e. in the direction of the open side of the shaft sealing ring, but does not touch the shaft sealing ring, 4.) pulling off the bottom part of the mounting tool along the second direction.

As a result of the spreading open of the sealing lip of the shaft sealing ring to its maximum expansion diameter, no material can be pulled any more under the sealing lip of the shaft sealing ring—everting of the sealing lip can be ruled out—during pulling off of the bottom part of the mounting tool in the second direction counter to the curvature of the sealing lip.

The mounting tool can be pushed in a preferred direction, namely in the first direction, through the shaft sealing ring in terms of the formation of the shaft sealing ring, in particular its sealing lip. The shaft which is actually pushed through the shaft sealing ring from the direction which has a tendency to everting, namely the second direction, does not touch the sealing lip of the shaft sealing ring during the high-risk joining operation (only the mounting tool touches the sealing lip of the shaft sealing ring) and thus also cannot evert it. By spreading open the sealing lip to its maximum expansion diameter via the mounting tool, the sealing lip can also no longer be everted by the pulling off of the bottom part of the mounting tool.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION OF THE INVENTION

The concepts of the present invention should be embodied in FIG. 1 to FIG. 5 on the basis of an arrangement of a housing 6 with an opening 7 in the region of which a shaft sealing ring 2 is fixed and a shaft 3 guided in a sealing manner through this opening 7 and thus through the shaft sealing ring 2.

Figure 5:
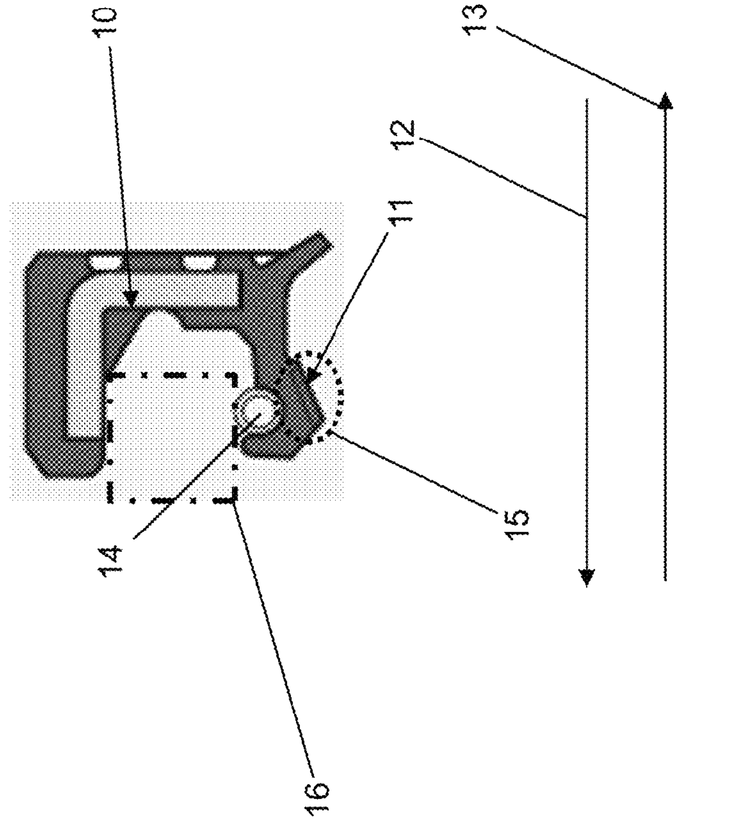
FIG. 5 shows a portion of a schematic cross-sectional representation of a shaft sealing ring.

The shaft sealing ring 2 has a metallic, annular main body 10, namely a sheet metal main body, a sealing lip 11 composed of plastic, arranged fixedly on the main body 10 and able to be placed in a sealing manner onto the shaft 3 and a spring washer 14 for pretensioning the sealing lip 11 in the direction of the shaft 3. The sealing lip 11 has a curvature 15 in the direction of the shaft 3 (FIG. 5).

A mounting tool 1 corresponding to the present invention is used to position a shaft sealing ring 2 on the shaft 3. In a final installation state, the shaft 3 is guided out of the housing 6 in the region of the opening 7, in a sealing manner via the shaft sealing ring 2. In the present exemplary embodiment, the shaft sealing ring 2 is arranged fixedly in the housing 6 and the shaft 3 is guided for mounting. An arrangement in which the shaft 3 is fixed and the shaft sealing ring 2 is guided to the shaft 3 is, however, also conceivable.

Figure 1:
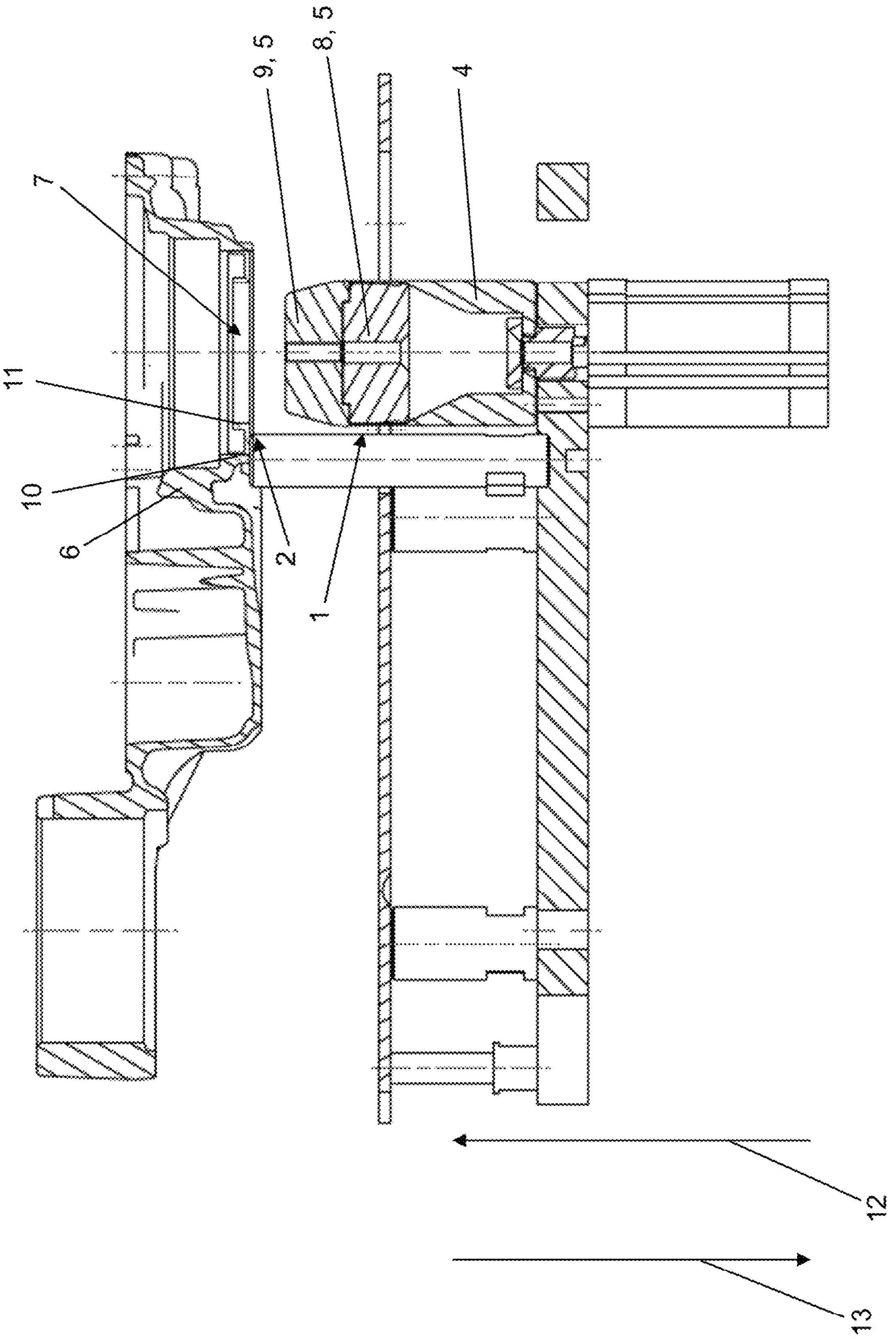
FIG. 1 shows a housing with an opening in which a shaft sealing ring is fixed and a mounting tool in a first position.
Figure 2:
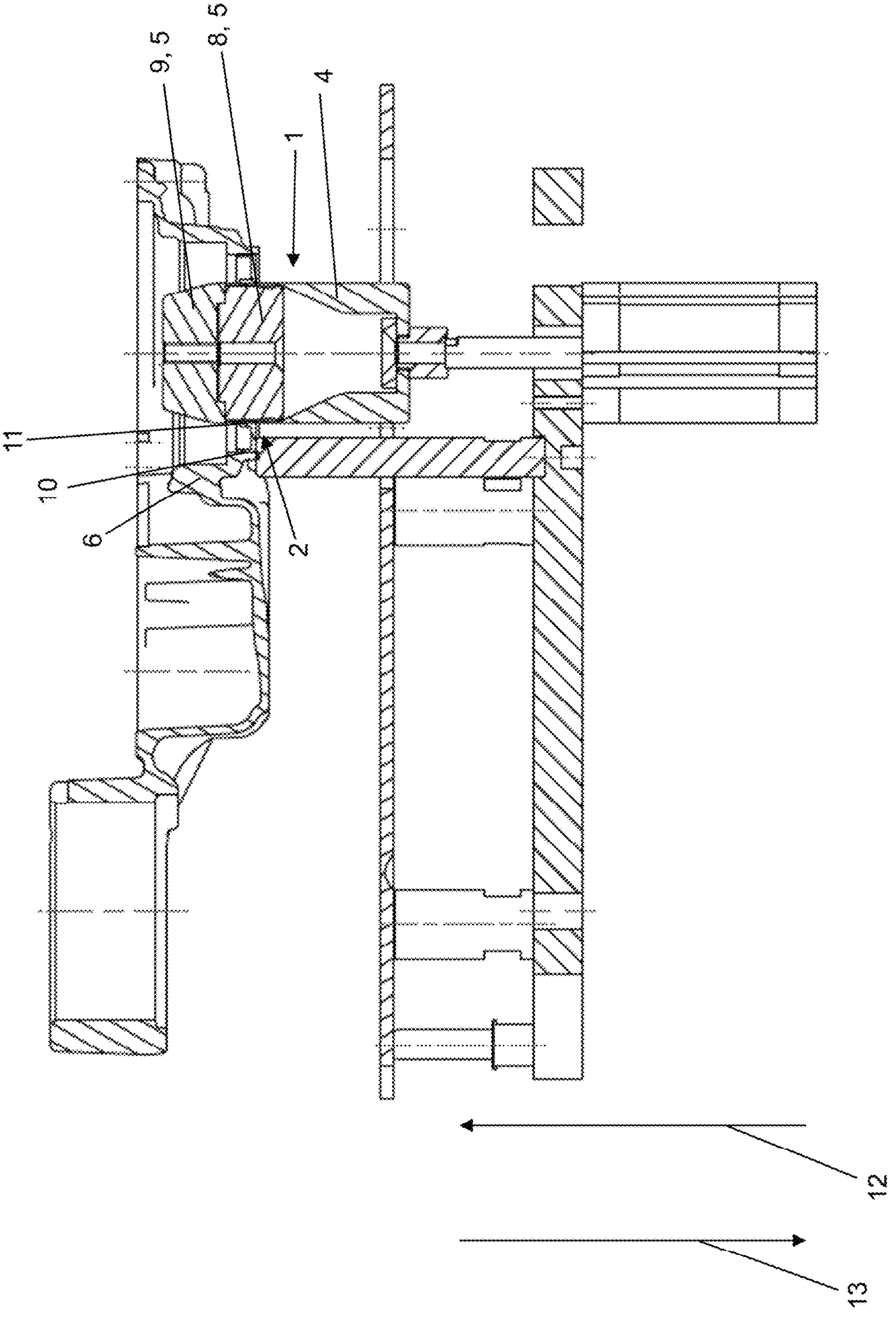
FIG. 2 shows a housing with an opening and a shaft sealing ring corresponding to FIG. 1 and a mounting tool in a second position, namely in a delivered position in which the mounting tool is guided through the opening and thus through the shaft sealing ring in the housing and a top part of the mounting tool can be removed.
Figure 3:
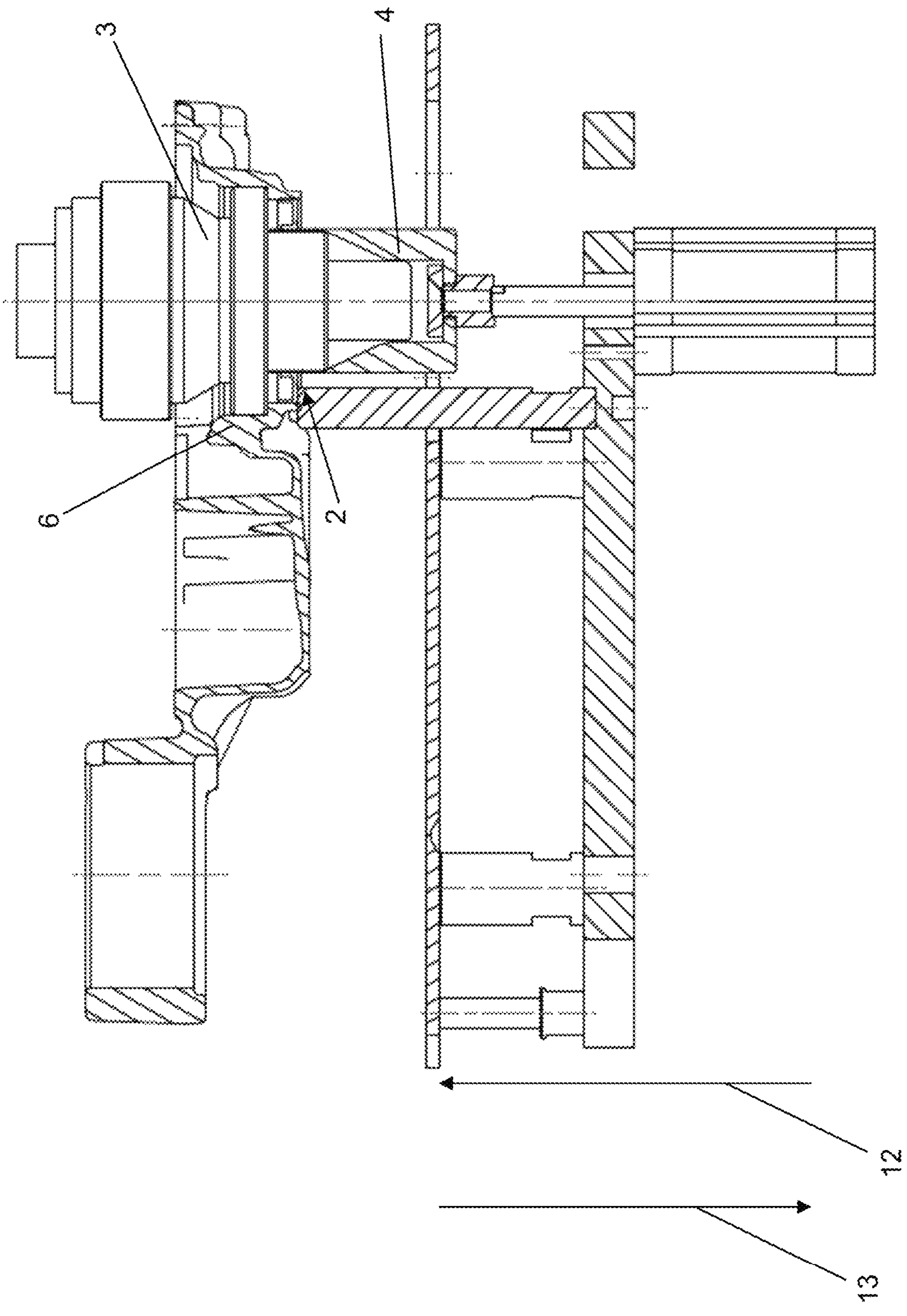
FIG. 3 shows a housing corresponding to FIG. 1 with a bottom part of the mounting tool and a shaft joined at the end.

The mounting tool 1 is embodied in two parts and comprises a cup-shaped bottom part 4 and a cover-like top part 5 (FIG. 1).

The top part 5 is fastened detachably on the cup-shaped bottom part 4 by virtue of the fact that it at one end, namely at a first end 8, is pushed partially into the bottom part 4 and at the other end, namely at a second end 9 pointing away from the bottom part 4, is embodied to be substantially conical, tapering in the direction of the second end 9 of the top part 5.

The top part 5 is manufactured partially from a plastic, namely in particular in the region of the first end 8 of the top part 5.

An outer diameter of the bottom part 4 of the mounting tool 1 is designed for the maximum expansion diameter of the shaft sealing ring 2, more precisely the sealing lip 15 of the shaft sealing ring 2.

The term "first direction" should be understood in this context as a direction along the curvature 15 of the sealing lip 11 of the shaft sealing ring 2, i.e. opposite an open side 16 of the shaft sealing ring 16. The term "second direction" should be understood in this context as a direction opposite to the curvature 15 of the sealing lip 11 of the shaft sealing ring 2, i.e. in the direction of the open side 16 of the shaft sealing ring 2. In relation to FIG. 1 to FIG. 5, the first direction consequently corresponds to a direction along a first arrow 12 and the second direction to a direction along a second arrow 13.

A method for producing a shaft seal with the shaft sealing ring 2 for the shaft 3 guided out of the housing 6, wherein the shaft is guided in a mounting direction counter to the curvature 15 of the sealing lip 11, i.e. in the direction of the open side 16 of the shaft sealing ring 2, out of the housing 6, is performed, as already mentioned above, using the mounting tool 1 (FIG. 1) and comprises at least the following steps:

1.) passing through the shaft sealing ring 2 with the mounting tool 1, the top part 5 first, along a first direction 12 so that the sealing lip 11 of the shaft sealing ring 2 is spread open to its maximum expansion diameter by the bottom part 4 counter to the force of the spring washer 14 (FIG. 2), As a result of the conical formation of the top part 5 of the mounting tool 1, easy and reliable spreading apart of a shaft sealing ring 2, more precisely the sealing lip 11 of the shaft sealing ring 2, from a preferred direction, namely the first direction along the curvature 15 of the sealing lip 11, i.e. opposite the open side 16 of the shaft sealing ring 2, is enabled.

2.) removing the top part 5 from the bottom part 4 along the first direction 12, The bottom part 4 of the mounting tool remains in the shaft sealing ring 2 and spreads apart the sealing lip 11 counter to the force of the spring washer 14 to its maximum expansion diameter.

Figure 4:
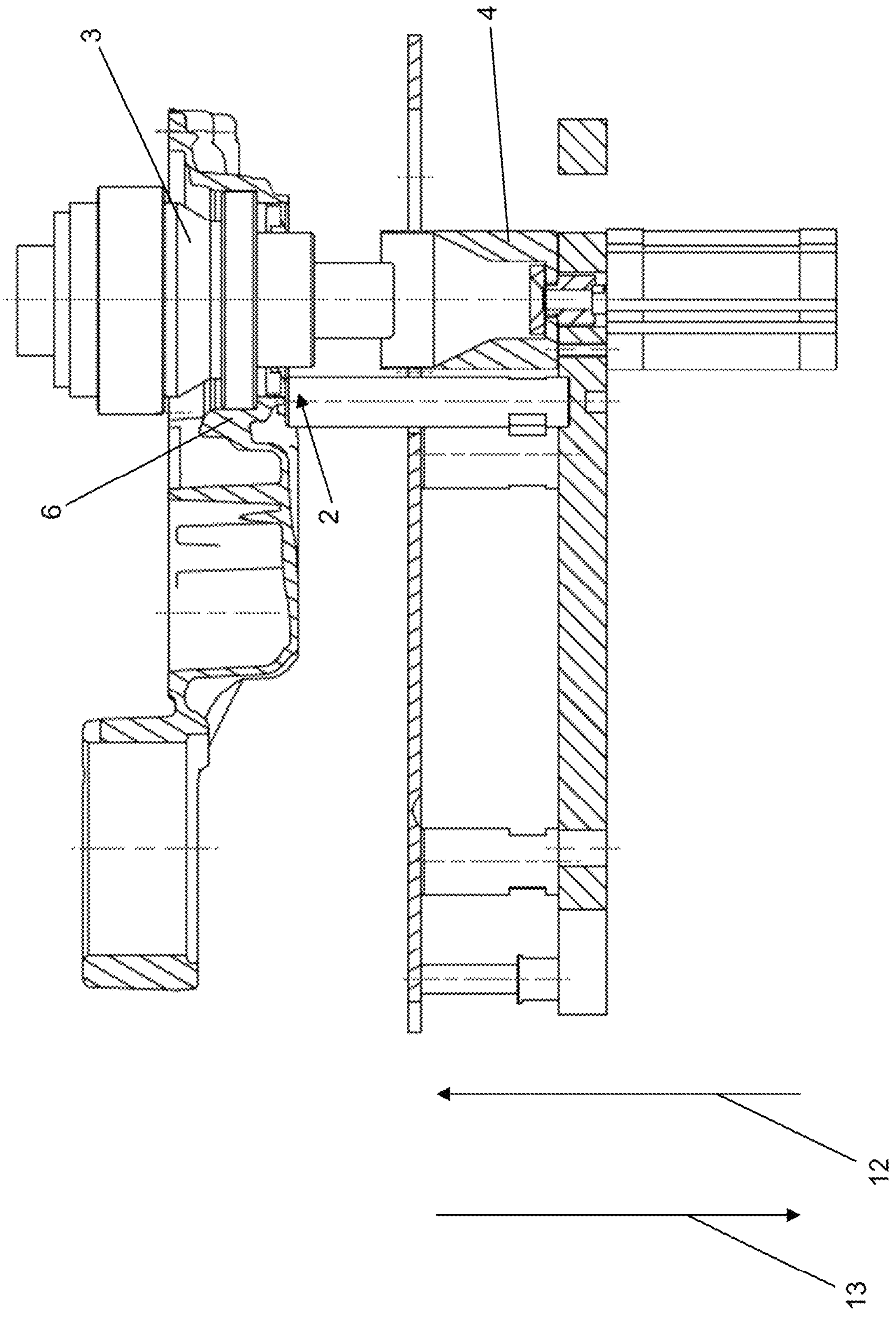
FIG. 4 shows an arrangement of housing and shaft in a final installation state, wherein a bottom part of the mounting tool was pulled off.

3.) introducing the shaft 3 into the bottom part 4 of the mounting tool 1, wherein the shaft 3 is guided along a second direction 13, namely a direction counter to the first direction 12 and thus counter to the curvature 15 of the sealing lip 11 of the shaft sealing ring 2 (FIG. 3), 4.) pulling off the bottom part 4 of the mounting tool 1 along the second direction 13 (FIG. 4).

As a result of the spreading open of the sealing lip 11 of the shaft sealing ring 2 to its maximum expansion diameter, no material can be pulled any more under the sealing lip 11 of the shaft sealing ring 2—everting of the sealing lip 11 can be ruled out—during pulling off of the bottom part 4 of the mounting tool 1.

The mounting tool 1 is pushed in the preferred direction, namely in the first direction 12 along the curvature 15 of the sealing lip 11, through the shaft sealing ring 2 in terms of the formation of the shaft sealing ring 2, in particular the sealing lip 11 of the shaft sealing ring 2. The shaft 3 which is actually pushed through the shaft sealing ring 2 from the direction which has a tendency to everting the sealing lip 11, namely the second direction 13 counter to the curvature 15 of the sealing lip 11 of the shaft sealing ring 2, does not touch the sealing lip 11 of the shaft sealing ring 2 during the high-risk joining operation and thus also cannot evert it.

By spreading open the sealing lip 11 of the shaft sealing ring 2 to its maximum expansion diameter, the sealing lip 11 can also no longer be everted by the pulling off of the bottom part 4 of the shaft sealing ring 2.

LIST OF REFERENCE DESIGNATIONS

1 Mounting tool
2 Shaft sealing ring
3 Shaft
4 Bottom part
5 Top part
6 Housing
7 Opening
8 First end (of the top part)
9 Second end (of the top part)
10 Main body
11 Sealing lip
12 First arrow (1st direction)
13 Second arrow (2nd direction)
14 Spring washer
15 Curvature (of the sealing lip)
16 Open side of the shaft sealing ring

What is claimed is:

1. A mounting tool for sealing positioning of a shaft sealing ring on a shaft against a curvature of a sealing lip of a shaft sealing ring, wherein the shaft sealing ring has a metallic, annular main body, a sealing lip which is arranged fixedly on the main body and can be placed in a sealing manner onto the shaft and a spring washer for pretensioning the sealing lip in the direction of the shaft, wherein the sealing lip has a curvature which is directed outward, in the direction of an opening formed by the shaft sealing ring, the mounting tool comprising:

a cup-shaped bottom part and a cover-shaped top part, wherein a bottom end of the top part is fastened detachably on the cup-shaped bottom part by being received by the cup-shaped bottom part, wherein a top end of the top part opposite the bottom end is substantially conical, and an outer diameter of the bottom part corresponds to the maximum extension diameter of the sealing lip of the shaft sealing ring.

2. The mounting tool as claimed in claim 1, wherein the top part is manufactured at least partially from a plastic.

3. A method for producing a shaft seal with a shaft sealing ring for a shaft guided out of a housing in a mounting direction counter to a curvature of a sealing lip of a shaft sealing ring, wherein the shaft sealing ring has a metallic, annular main body, a sealing lip which is arranged fixedly on the main body and can be placed in a sealing manner onto the shaft and a spring washer for pretensioning the sealing lip in the direction of the shaft, wherein the sealing lip has a curvature which is directed outward, in the direction of an opening formed by the shaft sealing ring, using a mounting tool, the mounting tool having a cup-shaped bottom part and a cover-shaped top part, wherein the top part is fastened detachably on the cup-shaped bottom part by virtue of the fact that the top part at one end is pushed partially into the bottom part, wherein the top part at the other end, namely at an end pointing away from the bottom part, is embodied to be substantially conical and an outer diameter of the bottom part corresponds to the maximum extension diameter of the sealing lip of the shaft sealing ring, the method comprising at least the following steps:

passing through the shaft sealing ring with the mounting tool, the top part first, along a first direction, namely a direction along the curvature of the sealing lip of the shaft sealing ring, so that the sealing lip of the shaft sealing ring is spread open to a maximum expansion diameter of the sealing lip by the bottom part counter to the force of the spring washer of the shaft sealing ring, removing the top part from the bottom part along the first direction, introducing the shaft into the bottom part of the mounting tool, wherein the shaft is guided along a second direction, namely a direction counter to the first direction and thus counter to the curvature of the sealing lip of the shaft sealing ring, pulling off the bottom part of the mounting tool along the second direction.

4. A method for positioning a sealing ring about a shaft, comprising:

providing a mounting tool having a bottom part having a cup shape and defining a compartment, a top part configured to cover the bottom part, the top part having a bottom end and a top end opposite the bottom end, the top end being substantially conical;

passing the sealing ring about the top end of the top part of the mounting tool to expand a sealing lip of the sealing ring;

pressing the bottom end of the top part into the compartment of the bottom part;

positioning the sealing ring about the bottom part;

removing the top part from the bottom part;

extending the shaft into the compartment of the bottom part;

positioning the sealing ring about the shaft; and removing the shaft from the bottom part with the sealing ring positioned about the shaft.

5. The method as set forth in claim 4, wherein the top part of the mounting tool is of a plastic material.

6. The method as set forth in claim 4, wherein the sealing ring has an annular main body, and wherein the sealing lip is connected to the main body.

7. The method as set forth in claim 6, wherein the sealing ring further has a spring washer configure to pretension the sealing lip in a direction toward the shaft.

8. The method as set forth in claim 7, wherein the sealing lip has a curvature for extending about the shaft.

9. The method as set forth in claim 7, wherein the bottom part has an outer diameter configured to provide maximum expansion to the sealing lip of the sealing ring against a force of the spring washer.

* * * * *